(12) United States Patent
Barr et al.

(10) Patent No.: US 8,959,508 B2
(45) Date of Patent: Feb. 17, 2015

(54) MITIGATING USER INTERRUPTION FOR PARTIALLY DOWNLOADED STREAMED AND VIRTUALIZED APPLICATIONS

(75) Inventors: Paul Clay Barr, Redmond, WA (US); Jow Keng Yap, Sammamish, WA (US); Bradley M. Corob, Kirkland, WA (US); Anzhelika Nishanova, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1347 days.

(21) Appl. No.: 12/484,352

(22) Filed: Jun. 15, 2009

(65) Prior Publication Data

US 2010/0318988 A1 Dec. 16, 2010

(51) Int. Cl.
  *G06F 9/445* (2006.01)
(52) U.S. Cl.
  CPC ........................................ *G06F 8/60* (2013.01)
  USPC .......................................... 717/178; 717/166
(58) Field of Classification Search
  CPC .......................................................... G06F 8/60
  USPC .......................................................... 717/178
  See application file for complete search history.

(56) References Cited

U.S. PATENT DOCUMENTS

| | | | |
|---|---|---|---|
| 6,769,019 B2 * | 7/2004 | Ferguson | 709/219 |
| 6,816,882 B1 | 11/2004 | Conner et al. | |
| 6,966,060 B1 | 11/2005 | Young et al. | |
| 7,062,567 B2 | 6/2006 | Benitez et al. | |
| 7,062,765 B1 | 6/2006 | Pitzel et al. | |
| 7,281,047 B2 | 10/2007 | Hayko et al. | |
| 7,484,207 B2 | 1/2009 | Sato | |
| 8,127,284 B2 * | 2/2012 | Meijer et al. | 717/166 |
| 2001/0034736 A1 * | 10/2001 | Eylon et al. | 707/200 |
| 2003/0084138 A1 | 5/2003 | Tavis et al. | |
| 2004/0153526 A1 | 8/2004 | Haun et al. | |
| 2004/0230971 A1 | 11/2004 | Rachman et al. | |
| 2006/0041884 A1 * | 2/2006 | Nakamura | 717/176 |
| 2006/0143264 A1 | 6/2006 | Payne et al. | |

(Continued)

OTHER PUBLICATIONS

Darragh, Patrick, "ClickOnce: Bringing Ease and Reliability to Smart Client Deployment", Retrieved at http://www.code-magazine.com/Article.aspx?quickid=0601041, Jan.-Feb. 2006, pp. 1-3.*

(Continued)

*Primary Examiner* — Wei Zhen
*Assistant Examiner* — Mohammed Huda
(74) *Attorney, Agent, or Firm* — Steve Crocker; Jim Ross; Micky Minhas

(57) ABSTRACT

Technologies are described herein for mitigating user interruption for partially downloaded or streamed virtual applications from a network, such as the Internet. A memory abstraction module can monitor page faults related to memory requests. A page fault may result from a memory request to load code that is not currently available and may trigger the retrieval of code from the network. A monitoring module may identify the quantity or frequency of page faults resulting in code fetches over the network. When the quantity or frequency of fetches over the network exceeds one or more thresholds, an indication of potential delay may be provided to the user. Modified code within an application can trigger download of a collection of code related to specific functionality within the application referred to as wrapped functionality. The user may be provided with a cancel button, or other mechanism, to abort the wrapped download.

18 Claims, 4 Drawing Sheets

(56) References Cited

U.S. PATENT DOCUMENTS

| | | | |
|---|---|---|---|
| 2006/0167810 A1 | 7/2006 | Bhambri et al. | |
| 2007/0107067 A1* | 5/2007 | Fountian | 726/33 |
| 2007/0219916 A1* | 9/2007 | Lucas | 705/58 |
| 2008/0133678 A1* | 6/2008 | Woodham et al. | 709/206 |
| 2008/0134165 A1 | 6/2008 | Anderson et al. | |
| 2008/0178298 A1 | 7/2008 | Arai et al. | |
| 2008/0301667 A1* | 12/2008 | Rao et al. | 717/172 |
| 2009/0029776 A1* | 1/2009 | Ruppert et al. | 463/42 |
| 2009/0029778 A1* | 1/2009 | Sispoidis et al. | 463/43 |
| 2009/0064135 A1 | 3/2009 | Jimmerson | |
| 2009/0083375 A1 | 3/2009 | Chong et al. | |
| 2010/0318987 A1 | 12/2010 | Barr et al. | |

OTHER PUBLICATIONS

"Alliagator Tags Archive for Tuesday, Mar. 25 2008", Retrieved at <<http://www.alligatortags.com/alligatortags-3-25-2008.html>>, Mar. 25, 2008, pp. 1-13.

U.S. Official Action dated Oct. 11, 2012 in U.S. Appl. No. 12/484,366.

"Take Your Apps Virtual with Microsoft SoftGrid", Retrieved Mar. 31, 2009 at http://technet.microsoft.com/en-us/magazine/2007.08. softgrid(printer).aspx?ref=autoworldgascar.info, pp. 1-4.

McKinzie, Kaye, "Thinstall Announces Version 3.2 Application Virtualization Solution, Supporting Full Range of Commercial and In-House Enterprise Applications", Retrieved at http://www. thinstall.com/company/releases/pr091707.htm, Sep. 17, 2007, pp. 1-3.

".Net 3.5 Client Product Roadmap", Retrieved Mar. 31, 2009 at http://weblogs.asp.neUscottgu/archive/2008/O2/19/net-3-5-client-product-roadmap.aspx, pp. 1-25.

"Application Streaming with Citrix Presentation Server 4.5", Retrieved Mar. 31, 2009 at http://www.firstebusiness.co.ukllibrary/ CitrixAppStreaming2007.pdf, pp. 1-4.

U.S. Official Action dated Dec. 10, 2013 in U.S. Appl. No. 12/484,366.

U.S. Official Action dated Dec. 4, 2014 in U.S. Appl. No. 12/484,366.

* cited by examiner

MITIGATING USER INTERRUPTION FOR PARTIALLY DOWNLOADED STREAMED AND VIRTUALIZED APPLICATIONS

BACKGROUND

When application software is sold or deployed online, or over a network, the application may be made available for execution by a user prior to the complete download of all application functionality. The user may unknowingly attempt to operate unavailable functionality while using the partially downloaded application. Where a portion of the application is unavailable when accessed by the user, the application may appear to have hung or failed. The application may continue to appear to be in a hung or failed state until download of the requested functionality has completed downloading. Leaving an application to appear to a user as hung or failed can result in termination of the application by the user. A user termination of an application may result in lost data and an unfavorable user experience.

It is with respect to these considerations and others that the disclosure made herein is presented.

SUMMARY

Technologies are described herein for mitigating user interruption for partially downloaded or streamed virtual applications from a network, such as the Internet. Through the use of these technologies, a user may be informed that a requested operation has triggered a download of application code from the network. The user may also be informed of a percentage complete or estimated time to completion for the download. The user may also be provided an opportunity to cancel the requested operation, instead of waiting for the download to complete.

According to one aspect of the technology presented herein, a memory abstraction module can monitor page faults related to memory requests. A page fault may result from a memory request to load code, or a file, that is not currently available. A page fault may trigger the retrieval of code from a network such as the Internet. The retrieved code may be used to service a user request for functionality or features that have not yet been downloaded.

A monitoring module may identify the quantity or frequency of page faults resulting in code fetches over the network. When the quantity or frequency of fetches over the network exceeds one or more thresholds, the monitoring module may indicate a potential delay to the user. For example, a window, dialog box, tray icon, tray icon bubble, or other user interface element may be provided to indicate to the user that a delay may be encountered during a fetch of application code over the network. The user may also be provided with information regarding the percentage complete or the estimated time to completion of the download.

According to another aspect of the technology presented herein, modified code within an application can hook specific user actions to trigger download of wrapped functionality. The wrapped functionality can be a collection of code related to specific functionality within the application. Modified application code can provide hooks for detecting requests for wrapped functionality. Such a request can initiate the download of wrapped code. A user interface indication may also be provided to the user. The user interface indication may be a window, dialog box, or other display. The user interface indication may include a status bar or status indicator. The status may include the download percentage complete or estimated time to completion. The user may also be provided with a cancel button, or other cancellation mechanism, to allow the user to proceed without waiting for completion of the download.

According to yet another aspect of the technology presented herein, application functionality that is not yet available may be grayed-out or otherwise indicated as unavailable within the user interface. Once the unavailable functionality has been downloaded from the network and made available within the application, the user interface may be updated to indicate availability of the newly downloaded functionality. The user may also be notified by window dialog boxes, tray icons, or tray icon bubbles that certain functionality has completed downloading. When all functionality has been downloaded, the user may be notified that the application is available for off-line execution.

Technology presented for mitigating user interruption for partially downloaded streamed virtual applications can provide an informative buffer between the application and a user when streaming or virtualization delay is encountered. The user may be informed of details concerning the delay, the cause of the delay, the estimated duration of the delay, and so forth. Thus, the user can be notified that the application will return to a responsive state upon completion of the download. This notification may prevent the user from unexpectedly terminating an application while the application is delayed.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
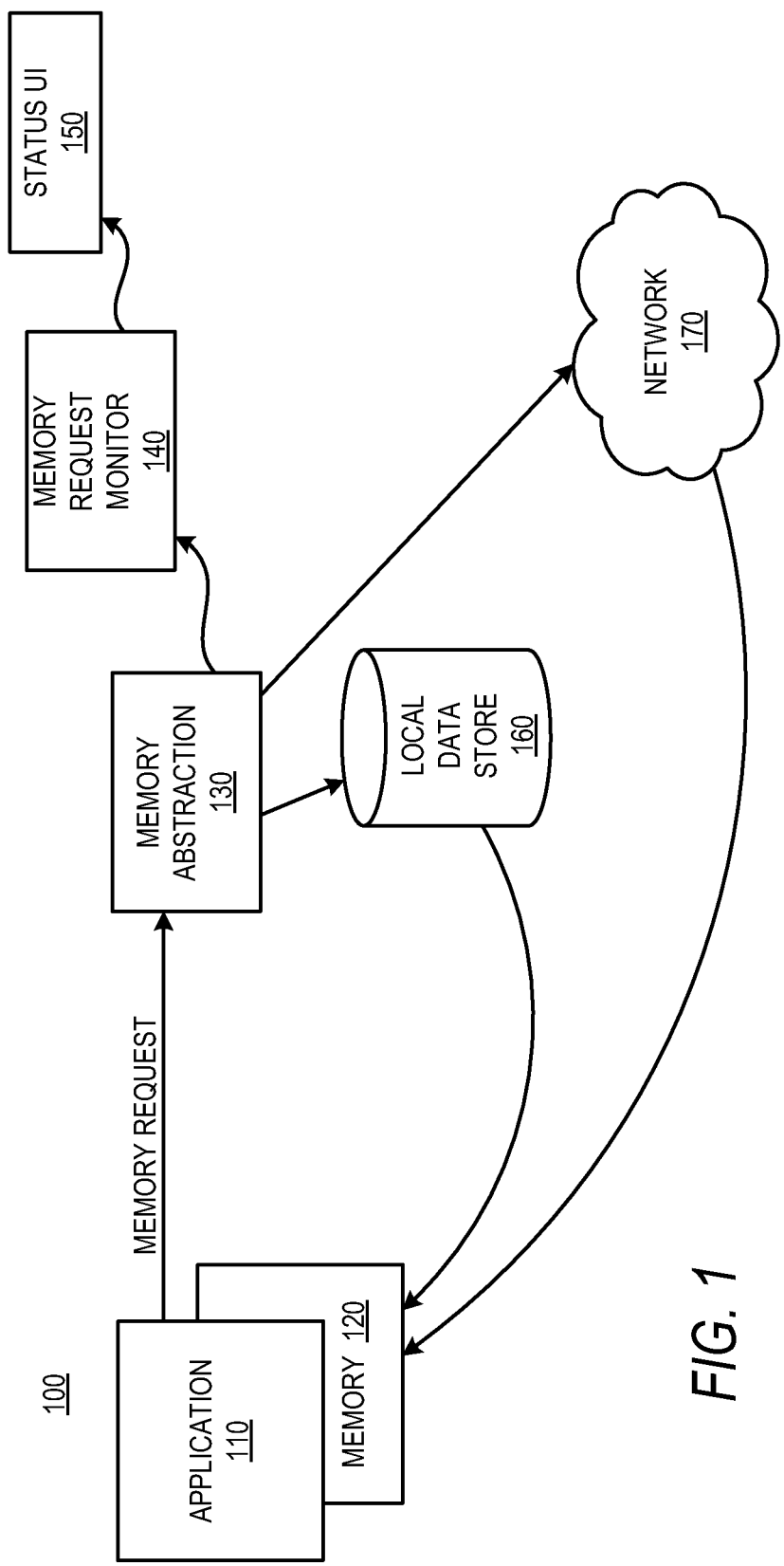
FIG. 1 is a block diagram illustrating an application capable of executing in a partially downloaded state according to one or more embodiments presented herein.

The following detailed description is directed to technologies for mitigating user interruption for applications partially downloaded from a network such as the Internet. Through the utilization of the technologies and concepts presented herein, an informative buffer may be provided between an application and a user when streaming or virtualization delay is encountered. The user may be informed of details concerning the delay. The user may also be notified that the application will return to a responsive state upon completion of the download. This notification may prevent the user from unexpectedly terminating an application while the application is delayed.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, concepts and technologies for mitigating user interruption for applications partially downloaded from a network will be described.

Turning now to FIG. 1, a block diagram 100 illustrates an application 110 capable of executing in a partially downloaded state according to one or more embodiments presented herein. The application 110 may have been deployed or purchased over a network 170 such as the Internet. The portions of the application 110 that have been completely downloaded may reside in local memory 120 or in a local data store 160. The local data store 160 may be, for example, a local hard drive where software, such as that for the application 110, may be stored along with user data and other information. When the application 110 attempts to access code that is not available in the local memory 120, a memory request may be issued to a memory abstraction layer 130.

The memory abstraction layer 130 may operate as part of a virtualization framework. The memory abstraction layer 130 may determine if the memory request may be satisfied from the local data store 160. If the information associated with the memory request may be satisfied by the local data store 160, the information may be transferred into the local memory 120 for use by the application 110. Alternatively, the memory request to access or page-in code for use by the application 110 may be identified by the memory abstraction layer 130 as not yet locally available. Code that is not locally available may be downloaded or streamed from the network 170. Code for the application 110 that is being downloaded or streamed from the network 170 may be stored to the local store 160 along with other code for the application 110. The functionality may also be loaded into local memory 120 for immediate access and execution by the application 110.

A memory request monitor 140 may track the quantity and frequency of fetches by the memory extraction layer 130 to the network 170. If the quantity or frequency of fetches from the network 170 exceeds one or more established thresholds, status information may be provided to the user. A status UI 150 may be used to indicate to the user that a delay may be caused by fetching code from the network 170. The status UI 150 may provide percentage complete, estimated time to completion, or various other pieces of status information to the user. The status UI 150 may also display a progress bar to the user. The status UI 150 may also provide a cancellation option to the user. The status UI 150 may be managed by the memory request monitor 140. As the memory request monitor 140 may be external from the application 110, the status UI 150 may continue to update and operate in the case of an nonresponsive application.

Certain functionality of the application 110 may be wrapped to insulate the user from potential delays while downloading the wrapped functionality. For example, code for large features may be bundled together as wrapped functionality. Common entry points to wrapped functionality may be intercepted by modified code within the application 110. Accessing these entry points may trigger direct download, from the network 170, of wrapped functionality. The application 110, portions of the application 110, or wrapped functionality may be packaged as a series of one or more feature blocks.

When a code download is estimated to cause a delay of greater than a predefined time period, an indication may be presented to the user. The indication may be reserved for delays of greater than one second. The indication may also be provided for other delay thresholds, or for all delays. The indication may be a window, dialog box, or other user interface mechanism. The indicator may specify download progress, such as percent complete or estimated time to completion.

Hooks associated with the common entry points of the modified code for the application 110 may be leveraged to also provide a cancellation mechanism. The cancellation mechanism may be associated with a window, dialog box, or other user interface element to provide a cancellation option, such as a cancel button, to the user. Cancellation may allow the user to avoid waiting for code to download by merely skipping execution of the requested feature or functionality. The wrapped functionality, along with other components of the application 110, may continue to download in the background.

In addition to the loading wrapped functionality, on-demand loading may also be supported. Although an application 110 download remains incomplete, program code associated with the remaining functionality may continue to download in the background. This downloading may progress as quickly as possible in order to provide off-line support. However, the user may attempt to execute a feature associated with a file or feature block of the application 110 that has not yet downloaded. In such an instance, the application 110 may attempt to access the memory or file associated with the features causing the memory abstraction layer 130 to attempt to retrieve the desired code or feature blocks from the network 170. This operation may be referred to as a page fault, an out of sequence request, or an on-demand load. The quantity or frequency of such page faults, or on-demand loads, may be tracked by the memory request monitor 140. When the quantity or frequency of page faults, or on-demand loads, exceeds one or more specified threshold, an indication may be provided to the user via the status UI 150

Figure 2:
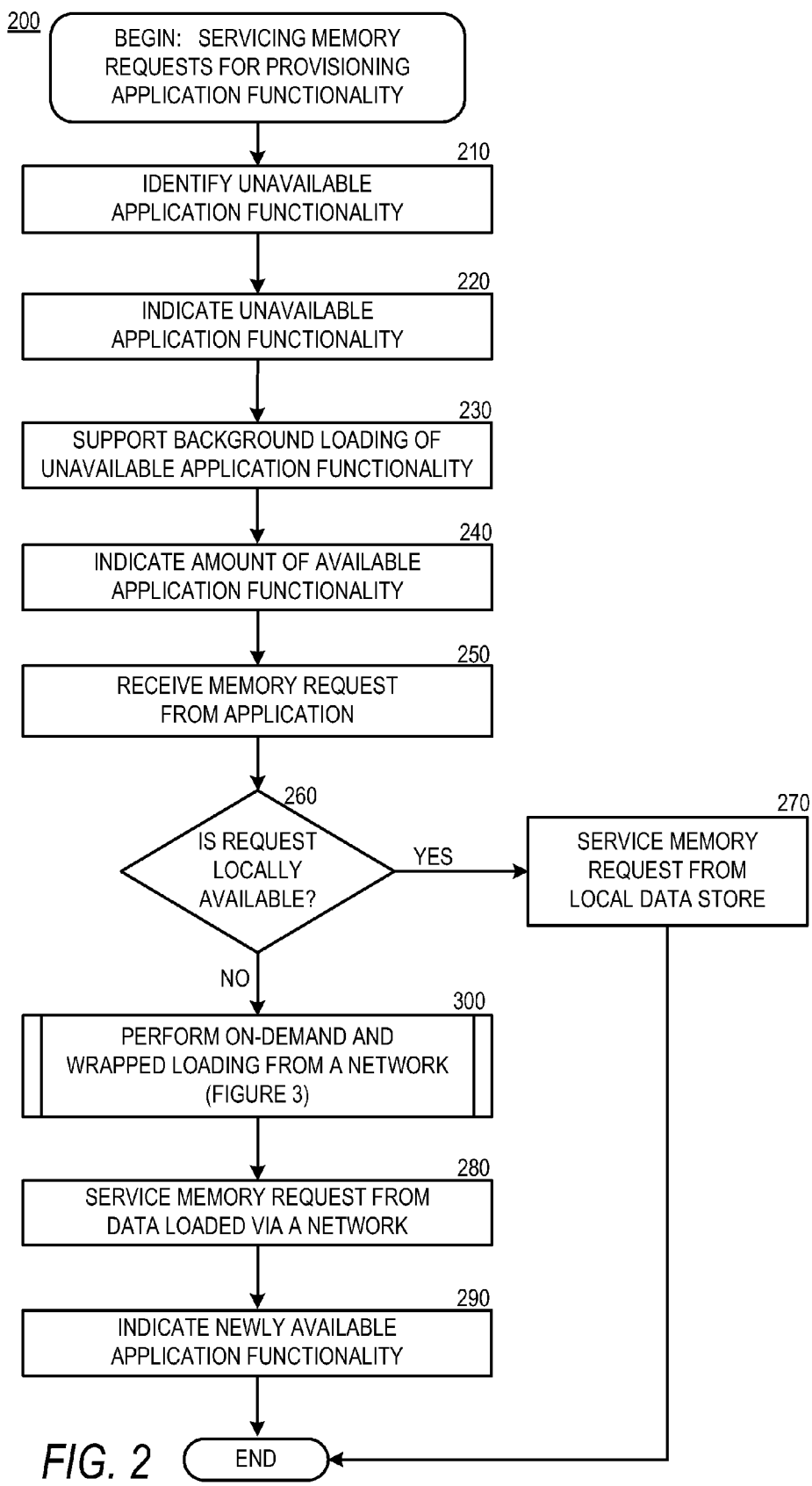
FIG. 2 is a flow diagram showing an illustrative process for servicing memory requests to provision application functionality from a network according to one or more embodiments presented herein.

Referring now to FIG. 2, additional details will be provided regarding the embodiments presented herein for mitigating user interruption for streamed and virtualized applications partially downloaded from a network. In particular, FIG. 2 is a flow diagram illustrating a method 200 for servicing memory requests to provision application functionality from a network according to embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may be performed sequentially, in parallel, or in a different order than as described herein.

A method 200 begins at operation 210 where unavailable application functionality is identified. The unavailable application functionality may be associated with a portion of the application 110 that has not yet been downloaded or streamed from the network 170. At operation 220, the unavailable application functionality identified at operation 210 may be indicated to the user. For example, a menu entry for the unavailable application functionality within the application 110 may be grayed-out or marked as unavailable. This indication may inform the user that the unavailable application functionality has not yet been downloaded and is not yet available for execution.

Continuing to operation 230, the background downloading of unavailable application functionality can be supported. While the application 110 may have already been made available for initial execution based on a set of startup functionality, remaining functionality or feature blocks may be unavailable as discussed with respect to operation 210. Unavailable application functionality may continue to be downloaded, streamed, or trickled from the network 170.

At operation 240, the amount of available application functionality may be indicated to the user. For example, a status bar or tray icon bubble may provide percent complete or estimated time to completion information related to the availability of application functionality. The application functionality status may indicate to the user when the application 110 will be fully available for off-line access. The availability of application functionality associated with application 110 may also indicate to the user when unavailable or grayed-out features may be fully available within the application 110.

Continuing to operation 250, a memory request may be received from the application 110. The memory request may be a request to access a file, module, or other portion of the application 110 and may involve paging-in of application code to the local memory 120. At operation 260, it can be determined if the memory request received in operation 250 is for locally available information resource or locally available code. If it is determined that the memory request received in operation 250 is for locally available code, the routine 200 may continue to operation 270, where the memory request can be serviced from a local data store 160.

If it is determined at operation 160 that the memory request from the application 110 is not serviceable from a local resource, the routine 200 may continue to subroutine 300, where on-demand and wrapped network loading of functionality may be performed. Further details related to subroutine 300 will be discussed below with respect to FIG. 3.

Continuing to operation 280, the memory request may be serviced from resources downloaded via the network 170 in subroutine 300. Feature blocks, functionality, or code downloaded using the on-demand or wrapped network loading operations of subroutine 300 may be placed to the local data store 160 or made available to the local memory 120 for access by the application 110.

Continuing to operation 290, newly available application functionality may be indicated to the user. For example, operations that were marked as unavailable or grayed-out in operation 220 may now be marked as available or the grayed-out status may be removed.

Figure 3:
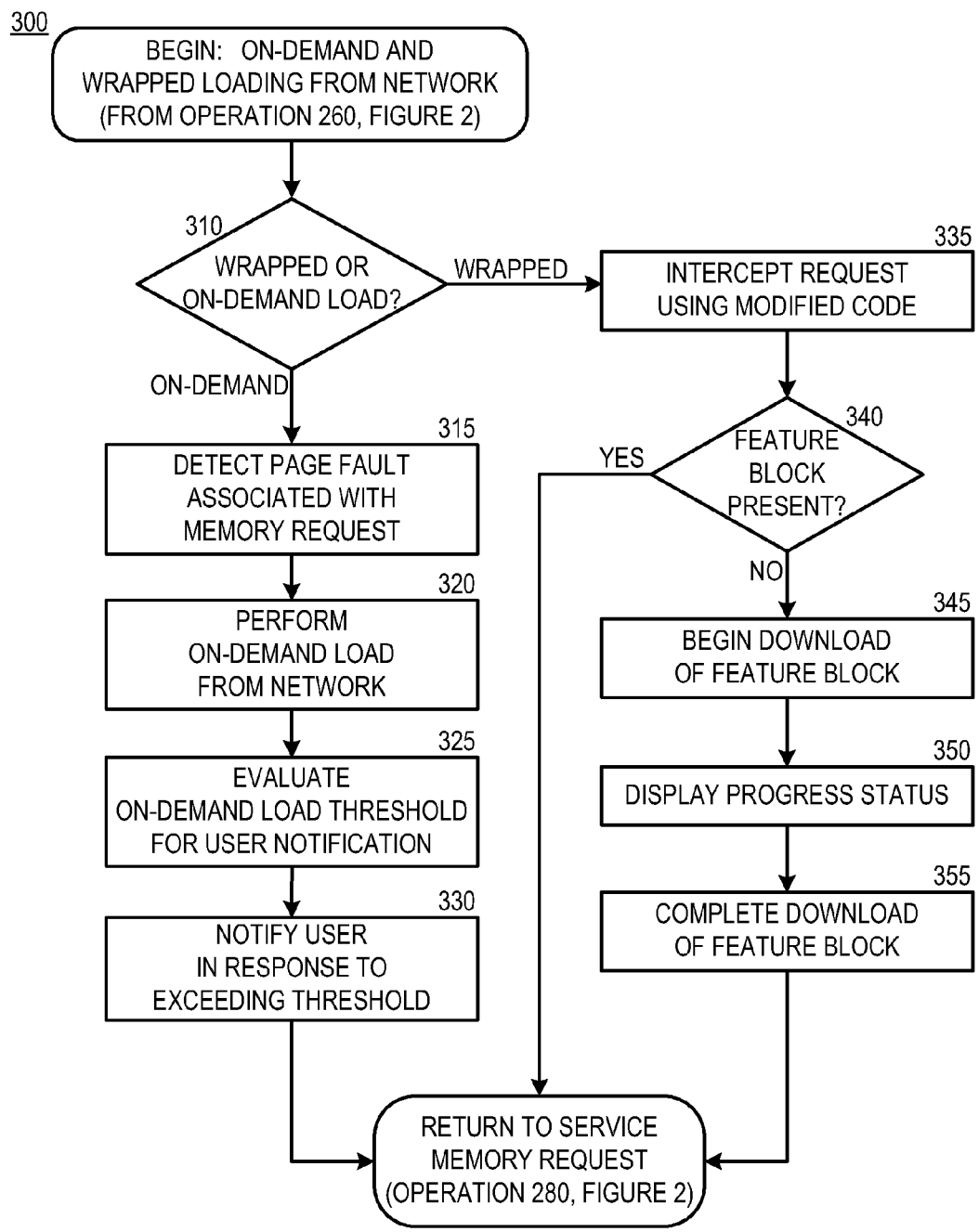
FIG. 3 is a flow diagram showing an illustrative process for on-demand and wrapped loading over a network according to one or more embodiments presented herein.

Referring now to FIG. 3, additional details will be provided regarding the embodiments presented herein for mitigating user interruption for streamed and virtualized applications partially downloaded from a network. In particular, FIG. 3 is a flow diagram illustrating a subroutine method 300 for on-demand and wrapped loading over a network according to one or more embodiments presented herein.

The subroutine 300 begins at operation 310 where it may be determined if a requested load is a wrapped or on-demand load. If the request is an on-demand load, the subroutine 300 may continue to operation 315 where a page fault associated with the memory request may be detected. A memory request or file access by the application 110 for code that is not yet available may result in a page fault or other on-demand loading indicator.

Continuing to operation 320, an on-demand load may be performed from the network. The on-demand load may retrieve the code, feature blocks, or functionality associated with the memory request. The on-demand load may make the retrieved code available to the local data store 160 or within the local memory 120 for access by the application 110.

Continuing to operation 325, the on-demand load threshold for user notification may be evaluated. The memory request monitor 140 may track the quantity and/or frequency of on-demand loads issued to retrieve functionality or feature blocks from the network 170 for use by the application 110. At operation 330, the user may be notified when the on-demand loads exceed one or more specified thresholds. Continuing from operation 330, the subroutine 300 may return to routine 200 to service the memory request.

If at operation 310, it was determined that the pending load is a wrapped load, the subroutine 300 may continue to operation 335 where the request may be intercepted using modified code associated with the application 110. The modified code may provide hooks or common entry points within the application 110 for determining when wrapped functionality should be downloaded from the network 170. Portions of the application 110 may be examined against a heuristic to identify features to include within a collection of wrapped functionality or wrapped feature blocks.

At operation 340, it may be determined if the wrapped functionality or feature blocks are present or remain to be downloaded. If it is determined at operation 340 that the wrapped feature blocks are present, the subroutine 300 may return to routine 200 and service the memory request. If instead, it is determined at operation 340 that the wrapped feature blocks are not locally present, the subroutine 300 may continue to operation 345 where downloading of the wrapped feature blocks may begin. The downloading of wrapped feature blocks may involve downloading the associated files or feature blocks from the network 170 to the local data store 160 or the local memory 120 for access by the application 110.

Continuing to operation 350, progress status may be displayed to the user concerning the progress of the download initiated in operation 345. The progress status may be provided as a percent complete, a progress bar, an estimated time to completion, or other status indication. Continuing to operation 355, the download of the wrapped feature block may be completed and made available to the application 110. Continuing from operation 355, the subroutine 300 may return to routine 200 to service the memory request.

Figure 4:
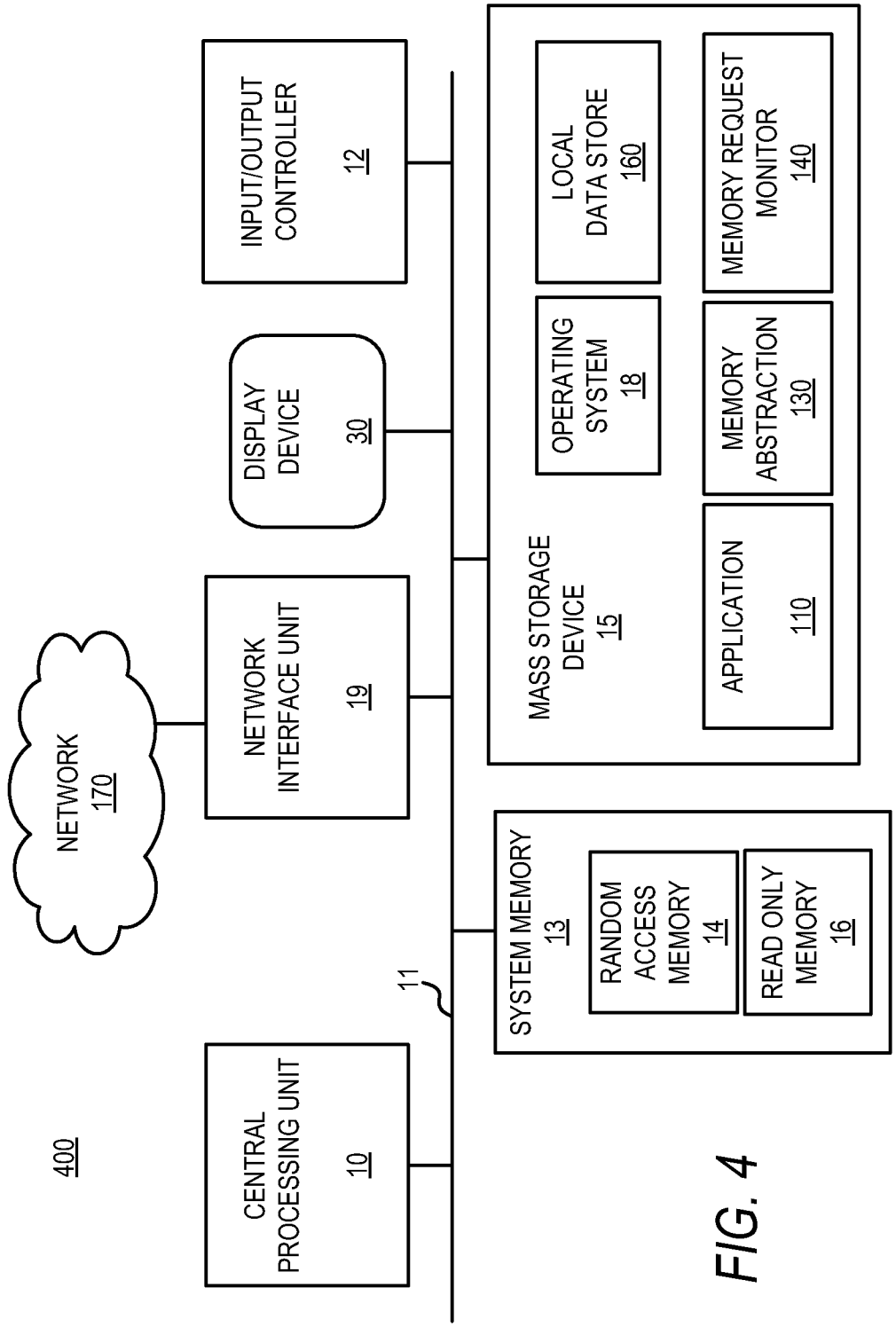
FIG. 4 is a computer architecture diagram showing an illustrative computer hardware architecture for a computing system capable of implementing embodiments presented herein.

Turning now to FIG. 4, an illustrative computer architecture 400 can execute software components described herein for mitigating user interruption for streamed and virtualized applications partially downloaded from a network. The computer architecture shown in FIG. 4 illustrates a conventional desktop, laptop, or server computer and may be utilized to execute any aspects of the software components presented herein. It should be appreciated however, that the described software components can also be executed on other example computing environments, such as mobile devices, television, set-top boxes, kiosks, vehicular information systems, mobile telephones, embedded systems, or otherwise. The computer architecture 400 may apply to the computer executing the streamed or virtualized application 110. The computer architecture 400 may also apply to any computer systems within the network 170.

The computer architecture illustrated in FIG. 4 can include a central processing unit 10 (CPU), a system memory 13, including a random access memory 14 (RAM) and a read-only memory 16 (ROM), and a system bus 11 that can couple the system memory 13 to the CPU 10. The system memory 13 may provide memory 120 used for the application 110. A basic input/output system containing the basic routines that help to transfer information between elements within the computer 400, such as during startup, can be stored in the ROM 16. The computer 400 may further include a mass storage device 15 for storing an operating system 18, software, data, and various program modules, such as those associated with the application 110, memory abstraction 130, the memory request monitor 140, and the local data store 160. The program modules can execute portions of software components, processes, and routines described herein.

The mass storage device 15 can be connected to the CPU 10 through a mass storage controller (not illustrated) connected to the bus 11. The mass storage device 15 and its associated computer-readable media can provide non-volatile storage for the computer 400. Although the description of computer-readable media contained herein refers to a mass storage device, such as a hard disk or CD-ROM drive, it should be appreciated by those skilled in the art that computer-readable media can be any available computer storage media that can be accessed by the computer 400.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network such as the network 170. The computer 400 may connect to the network 170 through a network interface unit 19 connected to the bus 11. It should be appreciated that the network interface unit 19 may also be utilized to connect to other types of networks and remote computer systems. The computer 400 may also include an input/output controller 12 for receiving and processing input from a number of other devices, including a keyboard, mouse, or electronic stylus (not illustrated). Similarly, an input/output controller 12 may provide output to, a printer, or other type of output device (also not illustrated). A display device 30 may be used for providing output from the computer 400 in the form of text, graphics, video, graphical user interface, any other user interface elements, or any combination thereof.

As mentioned briefly above, a number of program modules and data files may be stored in the mass storage device 15 and RAM 14 of the computer 400, including an operating system 18 suitable for controlling the operation of a networked desktop, laptop, server computer, or other computing environment. The mass storage device 15, ROM 16, and RAM 14 may also store one or more program modules. In particular, the mass storage device 15, the ROM 16, and the RAM 14 may store the program modules for the application 110, the memory abstraction module 130, or the memory request monitor 140 for execution by the CPU 10. The mass storage device 15, the ROM 16, and the RAM 14 may also store other types of program modules.

In general, software applications or modules such as the application 110, the memory abstraction module 130, or the memory request monitor 140 may, when loaded into the CPU 10 and executed, transform the CPU 10 and the overall computer 400 from general-purpose computing systems into special-purpose computing systems customized to mitigate user interruption for applications partially downloaded from a network. The CPU 10 may be constructed from any number of transistors or other discrete circuit elements, which may individually or collectively assume any number of states. More specifically, the CPU 10 may operate as one or more finite-state machines, in response to executable instructions contained within the software or modules. These computer-executable instructions may transform the CPU 10 by specifying how the CPU 10 transitions between states, thereby physically transforming the transistors or other discrete hardware elements constituting the CPU 10.

Encoding the software or modules onto the mass storage device 15 may also transform the physical structure of the mass storage device 15 or associated computer readable storage media. The specific transformation of physical structure may depend on various factors, in different implementations of this description. Examples of such factors may include, but are not limited to: the technology used to implement the computer readable storage media, whether the computer readable storage media are characterized as primary or secondary storage, and the like. For example, if the computer readable storage media is implemented as semiconductor-based memory, the software or modules may transform the physical state of the semiconductor memory, when the software is encoded therein. For example, the software may transform the states of transistors, capacitors, or other discrete circuit elements constituting the semiconductor memory.

As another example, the computer readable storage media may be implemented using magnetic or optical technology. In such implementations, the software or modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Based on the foregoing, it should be appreciated that technologies for mitigating user interruption for streamed and virtualized applications partially downloaded from a network are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for mitigating user interruption for an application partially downloaded from a network, the method comprising computer-implemented operations for:
   receiving a memory request from the application, the memory request related to a portion of code associated with the application;
   determining whether the memory request is for an on-demand load or a wrapped load, wherein the determination as to whether the memory request is for a wrapped load is performed utilizing modified code providing a hook or common entry point within the application for determining when wrapped functionality is to be downloaded from the network;
   in response to determining that the memory request is for an on-demand load,
      performing an on-demand load of the portion of code from the network;
   in response to determining that the memory request is for a wrapped load,
      identifying a portion of the application as the wrapped functionality and
      downloading the wrapped functionality; and
   servicing the memory request from code returned by the on-demand load or the wrapped load.

2. The computer-implemented method of claim 1, wherein in response to determining that the memory request is for an on-demand load, the method further comprises evaluating a quantity of on-demand loads performed against a specified quantity threshold and providing a notification in response to the quantity exceeding the specified quantity threshold.

3. The computer-implemented method of claim 1, wherein in response to determining that the memory request is for an on-demand load, the method further comprises evaluating a frequency of on-demand loads performed against a specified frequency threshold and providing a notification in response to the frequency exceeding the specified frequency threshold.

4. The computer-implemented method of claim 1, further comprising computer-implemented operations for indicating unavailable application functionality within a user interface.

5. The computer-implemented method of claim 1, further comprising computer-implemented operations for indicating newly available application functionality within a user interface.

6. The computer-implemented method of claim 5, further comprising computer-implemented operations for servicing the memory request from a local data store in response to detecting that the portion of code is locally available.

7. The computer-implemented method of claim 1, wherein in response to determining that the memory request is for a wrapped load, the method further comprises providing a cancellation mechanism to a user in association with downloading the wrapped functionality.

8. The computer-implemented method of claim 1, wherein in response to determining that the memory request is for a wrapped load, the method further comprises providing a status associated with downloading the wrapped functionality.

9. The computer-implemented method of claim 1, wherein in response to determining that the memory request is for a wrapped load, the method further comprises servicing the request to access the wrapped functionality from a local data store in response to detecting that the wrapped functionality is locally available.

10. A computer system comprising:
    a processing unit;
    a memory operatively coupled to the processing unit; and
    a program module which executes in the processing unit from the memory and which, when executed by the processing unit, causes the computer system to mitigate user interruption for an application partially downloaded from a network by
       receiving a memory request for a portion of the application not available in a local memory;
       determining whether the memory request is for an on-demand load or a wrapped load, wherein the determination as to whether the memory request is for a wrapped load is performed utilizing modified code providing a hook or common entry point within the application for determining when wrapped functionality is to be downloaded from the network;
       in response to determining that the memory request is the on-demand load, performing the on-demand load of the portion of the application from the network;
       in response to determining that the memory request is the wrapped load, identifying a portion of the application as the wrapped functionality and
       downloading one or more feature blocks associated with the wrapped functionality for execution within the application from the network; and
       servicing the memory request by the portion of the application returned by the on-demand load or the wrapped load.

11. The computer system of claim 10, wherein the program module further causes the computer system to provide a status associated with downloading the one or more feature blocks.

12. The computer system of claim 11, wherein providing the status comprises displaying a progress bar within a user interface.

13. The computer system of claim 10, wherein in response to determining that the memory request is for a wrapped load, the program module further causes the computer system to service the request to access the wrapped functionality from a local data store in response to detecting that the wrapped functionality is locally available.

14. The computer system of claim 10, wherein in response to determining that the memory request is for a wrapped load, the program module further causes the computer system to provide a cancellation mechanism to a user in response to downloading the one or more feature blocks.

15. The computer system of claim 10, wherein in response to determining that the memory request is for an on-demand load, the program module further causes the computer system to evaluate a quantity of on-demand loads performed against a specified quantity threshold and provide a notification in response to the quantity exceeding the specified quantity threshold.

16. The computer system of claim 10, wherein in response to determining that the memory request is for an on-demand load, the program module further causes the computer system to evaluate a frequency of on-demand loads performed against a specified frequency threshold and provide a notification in response to the frequency exceeding the specified frequency threshold.

17. The computer system of claim 10, wherein the program module further causes the computer system to indicate, within a user interface, application functionality that is newly available from the network.

18. An optical disk, a magnetic disk storage device, or a solid state storage device having computer-executable instructions stored thereon which, when executed by a computer, cause the computer to:
- receive a memory request from the application, the memory request related to a portion of code associated with the application;
- determine whether the memory request is for an on-demand load or a wrapped load, wherein the determination as to whether the memory request is for a wrapped load is performed utilizing modified code providing a hook or common entry point within the application for determining when wrapped functionality is to be downloaded from a network;
- in response to determining that the memory request is for an on-demand load,
  perform an on-demand load of the portion of code from a network,
  - evaluate a quantity of page faults against a specified quantity threshold,
  - provide a notification in response to the quantity exceeding the specified quantity threshold, and
  - service the memory request from code returned by the on-demand load;
- in response to determining that the portion of code is for a wrapped load, identifying a portion of the memory request as the wrapped functionality and downloading the wrapped functionality from the network; and
- service the memory request from the portion of code returned by the on-demand load or the wrapped load.

* * * * *